(12) United States Patent
Rodionov et al.

(10) Patent No.: US 12,017,546 B2
(45) Date of Patent: Jun. 25, 2024

(54) ELECTRIC POWER TRANSMISSION SYSTEM FOR A VEHICLE

(71) Applicant: VOLVO TRUCK CORPORATION, Gothenburg (SE)

(72) Inventors: Artem Rodionov, Gothenburg (SE); Per Widek, Torslanda (SE); Andreas Stockman, Västra Frölunda (SE)

( * ) Notice: Subject to any disclaimer, the term of this patent is extended or adjusted under 35 U.S.C. 154(b) by 468 days.

(21) Appl. No.: 17/413,378

(22) PCT Filed: Dec. 14, 2018

(86) PCT No.: PCT/EP2018/084919
§ 371 (c)(1),
(2) Date: Jun. 11, 2021

(87) PCT Pub. No.: WO2020/119917
PCT Pub. Date: Jun. 18, 2020

(65) Prior Publication Data
US 2022/0063423 A1  Mar. 3, 2022

(51) Int. Cl.
*B60L 1/00* (2006.01)
*B60L 50/53* (2019.01)
(Continued)

(52) U.S. Cl.
CPC ............. *B60L 50/53* (2019.02); *B60L 1/006* (2013.01); *B60L 50/64* (2019.02); *B60L 53/16* (2019.02);
(Continued)

(58) Field of Classification Search
CPC .......... B60L 1/006; B60L 50/53; B60L 50/64; B60L 53/14; B60L 53/16; B60L 53/20;
(Continued)

(56) References Cited

U.S. PATENT DOCUMENTS 5,293,947 A * 3/1994 Stratton ................. B60L 50/13
191/4
2009/0315393 A1* 12/2009 Yeh ......................... B60L 1/00
307/10.1
(Continued)

FOREIGN PATENT DOCUMENTS

CN    102088198 A    6/2011
CN    105409104 A    3/2016
(Continued)

OTHER PUBLICATIONS

International Search Report and Written Opinion dated May 17, 2019 in corresponding International PCT Application No. PCT/EP2018/084919, 10 pages.
(Continued)

*Primary Examiner* — Levi Gannon
(74) *Attorney, Agent, or Firm* — Venable LLP; Jeffri A. Kaminski

(57) ABSTRACT

The invention relates to an electric power transmission system (20) for a vehicle (10) comprising an energy storage system (30) for storing electrical power and a bidirectional power system (40) connected to the energy storage system, the bidirectional power system comprising a bidirectional DC/AC converter (50) for power conversion, the bidirectional DC/AC converter (50) being connected to the energy storage system, a junction unit (60) connected to the bidirectional DC/AC converter and comprising a charging interface (70) for connecting to an external power supply grid (72), and an electrical power take-off (ePTO) (80) interface for connecting to an external power load (82), and wherein the bidirectional power system is configured to perform any one of the following operations: an ePTO first operation (110), in which power is transferred from the energy storage system to the ePTO interface via the bidirectional power system, an ePTO second operation (120), in which power is (Continued)

transferred from the charging interface to the ePTO interface via the bidirectional power system, and a charging operation (130), in which power is transferred from the charging interface to the energy storage system via the bidirectional power system.

15 Claims, 6 Drawing Sheets

(51) Int. Cl.
  *B60L 50/64* (2019.01)
  *B60L 53/16* (2019.01)
  *B60L 53/20* (2019.01)
  *B60L 55/00* (2019.01)
  *H02J 7/02* (2016.01)

(52) U.S. Cl.
  CPC .............. *B60L 53/20* (2019.02); *B60L 55/00* (2019.02); *H02J 7/02* (2013.01); *B60L 2210/30* (2013.01); *B60L 2210/40* (2013.01)

(58) Field of Classification Search
  CPC .......... B60L 53/60; B60L 53/62; B60L 55/00; B60L 2210/30; B60L 2210/40; H02J 7/02
  See application file for complete search history.

(56) References Cited

U.S. PATENT DOCUMENTS

| | | | |
|---|---|---|---|
| 2010/0065349 A1* | 3/2010 | Ichikawa | ................ B60L 53/18 307/29 |
| 2011/0254494 A1 | 10/2011 | Briane et al. | |
| 2011/0266871 A1 | 11/2011 | Thisted | |
| 2012/0200151 A1* | 8/2012 | Obayashi | ................ B60L 50/61 307/104 |
| 2013/0193751 A1* | 8/2013 | Sugiyama | ............... B60L 1/003 307/9.1 |
| 2013/0200846 A1* | 8/2013 | Ang | ........................ B60L 1/003 320/109 |
| 2013/0249495 A1* | 9/2013 | Ang | ......................... H02J 7/04 320/134 |
| 2013/0297129 A1* | 11/2013 | Ang | ....................... B60W 10/26 180/65.265 |
| 2014/0028256 A1* | 1/2014 | Sugiyama | ............... B60L 53/22 320/109 |
| 2014/0232182 A1* | 8/2014 | Kinomura | ............... B60L 53/16 307/10.1 |
| 2014/0354195 A1 | 12/2014 | Li et al. | |
| 2016/0082844 A1 | 3/2016 | King et al. | |
| 2016/0152129 A1* | 6/2016 | West | ........................ B60L 5/36 180/65.21 |
| 2018/0309318 A1 | 10/2018 | Dharmadhikari et al. | |
| 2021/0155100 A1* | 5/2021 | Khaligh | .................. B60L 55/00 |

FOREIGN PATENT DOCUMENTS

| | | |
|---|---|---|
| CN | 108202642 A | 6/2018 |
| CN | 108448699 A | 8/2018 |
| CN | 108705928 A | 10/2018 |
| EP | 2117106 A1 | 11/2009 |
| EP | 3030440 A1 | 6/2016 |
| EP | 3180208 A1 | 6/2017 |
| WO | 9304887 A1 | 3/1993 |

OTHER PUBLICATIONS

International Preliminary Report on Patentability dated Mar. 30, 2021 in corresponding International PCT Application No. PCT/EP2018/084919, 7 pages.

Chinese Office Action dated Oct. 24, 2023 in corresponding Chinese Patent Application No. 201880100126.2. 20 pages.

* cited by examiner

ELECTRIC POWER TRANSMISSION SYSTEM FOR A VEHICLE

CROSS-REFERENCE TO RELATED APPLICATIONS

This application is a U.S. National Stage application of PCT/EP2018/084919, filed Dec. 14, 2018, and published on Jun. 18, 2020, as WO 2020/119917 A1, all of which is hereby incorporated by reference in its entirety.

TECHNICAL FIELD

The invention relates to an electric power transmission system for a vehicle. The invention also relates to a vehicle comprising such an electric power transmission system. The invention further relates to a method for controlling such an electric power transmission system by a control unit.

The invention can be applied in any type of hybrid vehicles or electrical vehicles, such as partly or fully electrical vehicles. Although the invention mainly is described with respect to an electrical truck, the invention is not restricted to this particular vehicle, but may also be used in other hybrid or electrical vehicles such as electrical working machines, electrical construction equipment, and electrical buses. The invention may also be applied in several different types of electrical working machines e.g. wheel loaders, articulated haulers, dump trucks, excavators, fire trucks, refrigerated trucks and backhoe loaders etc.

BACKGROUND

In the field of electrical charging systems and electrical propulsion systems for vehicles, such as electrical vehicles, there are several different configurations for storing of electrical energy on-board of the vehicle and for providing propulsion to the vehicle by converting electrical energy to electrical power. Typically, the energy storage system has a battery connected to an electrical machine for providing or absorbing electrical power as required by the system. Moreover, the energy storage system is generally arranged at a suitable location in the vehicle so as to ensure that the battery can be discharged and charged in an appropriate manner in terms of efficiency and safety. By way of example, such batteries are often rechargeable batteries and typically include a number of battery cells that may be connected in series and/or in parallel forming a complete battery pack system for the vehicle.

In these types of systems, charging of batteries are frequently performed by connecting the vehicle to an external electrical network when the vehicle is at stand still, e.g. an external line voltage static supply, such as a three-phase 400 volts static AC grid supply by means of an on-board or off-board battery charger. In this manner, current is transferred from the external electrical network to the batteries on board the vehicle.

In connection with charging of the batteries, it is desirable to ensure adequate solutions for supply of electrical power between various types of electrical equipment, such as the rechargeable batteries, the power source such as electrical machines, and the external electrical network. For example, the system should typically be arranged or configured to provide galvanic isolation between the external electrical supply network and the batteries on board the vehicle.

In order to connect different types of electrical equipment in a vehicle in a reliable and secure manner, some systems may comprise a junction unit. A junction unit is an electrical device for housing several different electrical connections to protect the connections and provide a safety barrier. In particular, some vehicle electrical charging systems have a junction unit arranged between the rechargeable batteries and the charging interface. By electrically connecting the charging interface and the rechargeable batteries with each other via the electrical junction unit, electrical power from the external electrical network grid to the batteries can be supplied in a safe and reliable manner.

With the increasing development in electrical propulsion system and on-board electrical energy storage systems, such as rechargeable batteries, a number of opportunities have also arisen for adapting on-board vehicle utilities to operate with support from the electrical energy storage system. Such utilities may include tools such as an on-board lifting crane or any other utilities. Thus, it would be desirable to further improve the electrical system of a vehicle, such as a partly or fully electrical vehicle, to meet the demands from various operators and users of the vehicles.

SUMMARY

An object of the invention is to provide an improved electric power transmission system for a vehicle, in which various functions such as charging and power supply can be provided in a versatile manner. The object is at least partly achieved by an electric power transmission system according to claim 1.

According to a first aspect of the invention, there is provided an electric power transmission system for a vehicle. The electric power transmission system comprises an energy storage system (EES) for storing electrical power and a bidirectional power system connected to the energy storage system. The bidirectional power system comprises a bidirectional DC/AC converter for power conversion. The bidirectional DC/AC converter is connected to the energy storage system. The bidirectional power system further comprises a junction unit connected to the bidirectional DC/AC converter. The junction unit comprises a charging interface for connecting to an external power supply grid, and an electrical power take-off (ePTO) interface for connecting to an external power load.

Moreover, the bidirectional power system is configured to perform any one of the following operations:
- an ePTO first operation, in which power is transferred from the energy storage system to the ePTO interface via the bidirectional power system,
- an ePTO second operation, in which power is transferred from the charging interface to the ePTO interface via the bidirectional power system, and
- a charging operation, in which power is transferred from the charging interface to the energy storage system via the bidirectional power system.

In this manner, the bidirectional power system is arranged to set the electric power transmission system in a number of operations depending on the desired type of use of the system. In other words, the bidirectional power system is configured to control electrical power flow between the energy storage system and the external power supply grid when the bidirectional power system is in the charging operation and the charging interface is connected to the external power supply grid. Moreover, when the bidirectional power system is in the ePTO first operation, the bidirectional power system is arranged to control electrical power between the energy storage system and the external power load when connected to the ePTO interface. Also, when the bidirectional power system is in the ePTO second operation, the bidirectional power system is arranged to control electrical power between the external power supply grid when connected to the charging interface and the external power load when connected to the ePTO interface.

To this end, the bidirectional power system is arranged to transfer electrical power in-between the ESS, the charging interface and the ePTO interface. Hence, the bidirectional power system is a system arranged for directing power in various directions and to various interfaces, while maintaining an adequate level of reliability and safety during use thereof. In particular, the bidirectional power system is configured to direct electrical power from the ESS to the ePTO interface. In addition, the bidirectional power system is configured to direct electrical power from the charging interface to the ePTO interface. Further, the bidirectional power system is configured to direct electrical power from the charging interface to the ESS. Still further, the bidirectional power system is configured to direct electrical power from ESS to the charging interface.

Accordingly, the example embodiments of the electric power transmission system provide a multi-functional device having a charging interface and an ePTO interface to permit charging and discharging of the ESS, while providing electrical power to the external power load connected to the ePTO interface. Accordingly, the electric power transmission system may be operated as an onboard charger unit, and as a system for delivering power to an ePTO interface. Also, the example embodiments allow for simultaneous operation of the electric power transmission system such that electrical power can be transferred between the ESS, the external power grid and to the external power load. The external power load may be a third party installation, such as a body-builder equipment. By way of example, it becomes possible to charge the ESS, meanwhile the external power load (connected to the ePTO interface) is powered directly by the external power supply grid, which is connected to the charging interface. In addition, it may be possible to support an external power supply grid with electrical power from the ESS, meanwhile the ESS also can provide electrical power to the external power load connected to the ePTO interface.

To this end, the electric power transmission system according to the example embodiments may eliminate, or at least reduce, the need of manually connecting/disconnecting the external power load (e.g. a body-builder equipment) when the vehicle needs to be charged. Moreover, it is believed that the example embodiments of the invention allow for increased possibilities for adding third party equipment powered by the ESS. Further, the example embodiments provide for a seamless transmission of power. In particular, the example embodiments provide for a seamless transmission of power to the ePTO when utilizing the external power supply grid to power the external power load via the ePTO interface.

Accordingly, the example embodiments of the invention provide several different functionalities, such as charging, discharging and power supply to the external power loads in one common unit. It is also believed that this type of system is less expensive, yet still multi-functional, compared to a system having one bidirectional charger for onboard charging operation and another separate system for ePTO operation.

The example embodiments of the electric power transmission system are particularly useful for vehicles such as electrical vehicles, including partly and fully electrical vehicles, hybrid electrical vehicles, plug-in hybrid electrical vehicles or any other type of electrical vehicle. Electrical vehicles are provided with electrical machine(s) and generally an energy storage system such as a battery pack system. The energy storage system is typically configured to provide power to the electrical machine, thereby providing propulsion for the vehicle and also to power any other types of external electrical loads in various types of construction equipment and other equipment. By way example, the example embodiments can be installed in a crane truck to allow for simultaneous use of the crane (powered by the ESS via the ePTO interface), while supplying electrical power from the ESS to the external supply grid via the charging interface. In other words, the example embodiments provide for an extended range of applications when the external power load is a stationary application of the vehicle.

The electrical power take-off interface is configured to provide electrical power to the external power load. The external power load refers to an electrical power load, and is typically an external type of a vehicle external electrical load such as electrical auxiliaries. One example of an external electrical power load is a so called "body-builder" accessory for powering "body-builder equipment". The term "body-builder equipment" generally refers to a piece of equipment which is carried, permanently or not, by the vehicle and may include a trash compactor, a cargo refrigerating unit, a dump body, a crane, a ladder, etc.

The bidirectional DC/AC converter is for example an inverter configured to provide a two way power flow. The bidirectional DC/AC converter is configured both for DC to AC conversion taking power from the battery and for AC to DC conversion for charging the battery. The bidirectional DC/AC converter can be provided in several different configurations. One example of a suitable bidirectional DC/AC converter is a 2-level Voltage Source Inverter. According to one example embodiment, the bidirectional DC/AC converter is operable in a first mode, in which power is transferable from the ESS to the junction unit, and in a second mode, in which power is transferable from the junction unit to the ESS.

The electric power transmission system may be a part of an overall vehicle electrical system. Typically, the electric power transmission system is part of a traction voltage system of a vehicle. By way of example, the electric power transmission system may be an integral part of an electrical propulsion system. However, the electric power transmission system may likewise be a separate system in communication or connected to the electrical propulsion system. Generally, the term "electrical propulsion system", as used herein, typically refers to vehicle electrical components for providing energy (such as traction energy) and for storing energy (delivering and receiving energy). In other words, an electrical propulsion system refers to a system configured to provide propulsion to a vehicle by converting electrical energy to mechanical energy, the electrical energy provided by means of the on-board energy storage system. Besides the electrical components as mentioned above, an electrical propulsion system may include one or more electrical machines and additional components such as cable(s), sensor(s), control units, battery management unit(s) etc. The electrical propulsion system is in particular configured to deliver and receive energy for providing propulsion to the vehicle, but also for performing various vehicle operations of the vehicle.

The energy storage system (ESS) is typically a DC electrical power source. By way of example, the energy storage system is a battery pack system (a system of interconnected battery packs). However, the DC electrical power source may be provided in the form of a battery pack system or an onboard fuel cell system. It is to be noted that the battery pack system can refer to one or several number of battery pack(s). In addition, it is to be noted that the battery pack system can include different types of batteries. By way of example, any one of the batteries in the battery pack system is any one of a lithium-ion battery or sodium-ion battery. A sodium-ion battery typically includes any type of sodium iron battery or sodium ferrite battery. The battery pack system thus typically comprises a set of battery packs. Also, it is to be noted that the battery pack is generally a so called high voltage battery pack. In this context, the term "high voltage" refers to a battery pack of about 400-1000 voltage (V). Further, the term "power", as used herein, typically refers to electrical power.

It should be noted that the bidirectional power system is typically configured to permit the electric power transmission system to perform both the ePTO first operation, in which power is transferable from the energy storage system to the ePTO interface via the bidirectional power system, and in the ePTO second operation, in which power is transferable from the charging interface to the ePTO interface via the bidirectional power system. In addition, the bidirectional power system is typically adapted to simultaneously operate the electric power transmission system in the ePTO first operation and in ePTO second operation. According to one example embodiment, the bidirectional power system is configured to permit the electric power transmission system to perform the ePTO first operation and the ePTO second operation in a simultaneous manner. However, in the system, electrical power is typically only transferable in one direction at a time in the bidirectional DC/AC converter.

Hence, according to one example embodiment, the bidirectional power system is configured to simultaneously permit transfer of power in one direction between the energy storage system and the charging interface system and transfer of power from the energy storage system to the ePTO interface. In this manner, the electric power transmission system allows for charging or discharging the ESS while providing power to the external electrical load such as the body-builder equipment via the ePTO interface.

It should be noted that electrical power is only transferable in one direction via the bidirectional DC/AC converter. That is, electrical power is either transferable from the energy storage system to any one of the charging interface and the ePTO interface via the bidirectional power system or from the charging interface to any one of the energy storage system and the ePTO interface via the bidirectional power system. In other words, by the configuration of the bidirectional power system, it becomes possible to provide electrical power from the charging interface to the ePTO interface when the system is connected to the external power supply grid via the charging interface.

To this end, the bidirectional power system is configured to simultaneously perform the ePTO second operation and the charging operation.

In addition, or alternatively, the bidirectional power system is configured to simultaneously permit transfer of power from the energy storage system to the ePTO interface and transfer of power from the charging interface to the ePTO interface. According to one example embodiment, the bidirectional power system is configured to simultaneously perform in the ePTO first operation and the ePTO second operation.

Further, the bidirectional power system may be configured to transfer power from the energy storage system to the charging interface. As such, the ESS is used to support the external power supply grid with power. In this manner, the bidirectional power system is configured to operate the electric power transmission system in an external power supply operation, in which power is transferred from the energy storage system to the charging interface via the bidirectional power system. For example, when the electric power transmission system is in the external power supply operation, the electric power transmission system is capable of supporting the external power supply grid at peak loads in the external power supply grid.

In addition, or alternatively, the electric power transmission system is further configured to transfer power from the energy storage system to another external power source via the bidirectional power system. By way of example, the junction unit comprises an additional power supply interface connectable to the external power source. Alternatively, the ePTO interface may be used for islanding operation of the system. By this configuration, the electric power transmission system can operate in a so called islanding operation, i.e. power supply for island operation, in which electrical power is transferable from the energy storage system to the external power source, e.g. to establish an external micro power grid. In other words, the ESS may be used for providing power to an external source. Typically, although strictly not required, the charging interface may comprise an additional connector for islanding.

According to one example embodiment, the junction unit comprises a controllable switch configured to control flow of power between the junction unit and the charging interface. The controllable switch is may be arranged to turn off the transfer of power to the charging interface. Hence, the controllable switch is arranged to ensure that there is no voltage at the charging interface. Typically, the controllable switch is configured to control flow of power between the junction unit and the charging interface when the charging interface is connected to the external power supply grid. The controllable switch is typically in communication with a control unit. The advantage with having a controllable switch in the junction box is that the flow of power can be controlled by a control unit, as mentioned below.

In addition, the junction unit may comprise a first sensor configured to determine an electrical characteristic of the external power supply grid. In addition, the junction unit may comprise a second sensor configured to determine the flow of current to the external power load. Typically, although strictly not required, the junction unit comprises a combination of the controllable switch, the first sensor and the second sensor, as mentioned above.

The first sensor allows for measuring the electrical characteristics of the external power supply grid so as to adjust the bidirectional DC/AC converter to the external power supply grid. In this manner, it becomes possible to permit the external power supply grid to supply electrical power to the external power load connected to the ePTO interface without an interruption in the transfer of power to the ePTO interface. By the provision of having a second sensor in the junction unit, the second sensor being configured to determine the flow of current to the external power load, it becomes possible to determine if the external power supply grid can deliver a sufficient level of electrical current to the external power load connected to the ePTO interface as well as determine if there is any available electrical power for charging the energy storage system, i.e. if there is any available power that can be transferred from the external power supply grid to (onboard) energy storage system.

By way of example, the electrical characteristics determined by the first sensor is indicative of any one of amplitude, a frequency and a phase angle of the voltage from the external power supply grid.

Typically, although strictly not required, the bidirectional DC/AC converter is configured to match amplitude, frequency and phase angle of the voltage from the external power supply grid. In this manner, the bidirectional DC/AC converter can synchronize its operation with the external power supply grid. Further, this configuration provides for maintaining a constant power supply to the external load when changing operations from one of the ePTO operations to the charging operation. In other words, by matching amplitude, frequency and phase angle of the bidirectional DC/AC converter with the amplitude, frequency and phase angle of the voltage from the external power supply grid, it becomes possible to ensure that the electric power transmission system can deliver an efficient level of power to the energy storage system and/or the ePTO interface, as desired.

Typically, the electric power transmission system is in communication with a control unit arranged to control operation of the bidirectional power system. In addition, the control unit is typically arranged to control the other components of the electric power transmission system such as the charging interface and the ePTO interface. In addition, or alternatively, the control unit is typically configured to communicate with the external power supply grid and the external power load. The electric power transmission system may typically include a control pilot, as mentioned below, in order to provide a sufficiently level of communication between the components.

According to one example embodiment, the electric power transmission system comprises the control unit arranged to operate the bidirectional power system. The control unit may be arranged inside the junction unit. In addition, or alternatively, the control unit may be arranged remotely from the junction unit. In addition, or alternatively, the control unit may be an integral part of an existing electronic control unit (ECU) arranged onboard the vehicle.

According to one example embodiment, the control unit is configured to control charging communication between the external power supply grid, the bidirectional DC/AC converter and the vehicle. By way of example, the control unit is configured to determine the fuse size of the external power supply grid and compare the fuse size of the external power supply grid with the fuse size of the external power load. In this manner, it becomes possible to estimate whether the fuse size of the external power supply grid is enough to power the external power load. The control unit is typically configured to communicate with the bidirectional DC/AC converter, the junction unit including the charging interface and the ePTO interface, the external power supply grid, the external power load and with the ESS.

The external power supply grid is e.g. a static external electrical power supply, e.g. an electrical power static AC grid supply, an external DC source. By way of example, the external power supply grid is a charging station. Typically the ESS is charged and powered when connected to the external power supply grid during stand-still of the vehicle. The vehicle is typically connected to the external power supply grid when there is a need for charging the energy storage system in the stand-still position of the vehicle.

The control unit is generally an electronic control unit. The control unit may include a microprocessor, microcontroller, programmable digital signal processor or another programmable device. Thus, the control unit comprises electronic circuits and connections as well as processing circuitry such that the control unit can communicate with different parts of the electric power transmission system and any other parts in need of being operated in order to provide the functions of the example embodiments. Depending on the type of control unit and location of the control unit, the control unit may also be configured to communicate with other parts of the vehicle such as the electrical machines, brakes, suspension, the clutch, transmission and further electrical auxiliary devices, e.g. the air conditioning system, in order to at least partly operate the vehicle. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transitory memory for storing computer program code and data upon. Thus, the control unit may be embodied by many different constructions.

In other words, the control functionality of the example embodiments of the electric power transmission system may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium.

Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While the example embodiments of the electric power transmission system described above can include a control unit being an integral part thereof, it is also possible that the control unit may be a separate part of the vehicle, and/or arranged remote from the electric power transmission system and in communication with the electric power transmission system.

According to one example embodiment, the control unit is configured to control the bidirectional power system of the electric power transmission system to set the electric power transmission system in the number of operations, as mentioned above.

Typically, although strictly not required, the bidirectional power system is galvanically isolated. By way of example, the bidirectional DC/AC converter is typically galvanically isolated relative the chassis of the vehicle. In this manner, it becomes possible to use a high switching frequency in bidirectional DC/AC converter, while protecting the electrical system(s) of the vehicle and the external power supply grid from interference etc.

According to one example embodiment, the junction unit comprises a second controllable switch configured to control flow of power between the junction unit and the ePTO interface. In this manner, it becomes possible to terminate the flow of power to the ePTO interface by means of the controllable switch and the control unit. By way of example, the junction unit comprises a second controllable switch configured to control flow of power between the junction unit and the ePTO interface when connected to the external load. In this manner, it becomes possible to provide one phase charging from the external power supply grid to the ESS. In addition, the second controllable switch allows for terminating the flow of current to the ePTO interface, which may be desired when charging of the ESS is prioritized by the system and the vehicle. By way of example, the charging interface typically comprises a connector such as a type 2 connector, an extended charging connector or the like.

Analogously, the ePTO interface typically comprises a connector such as a ring terminal, standard 3 phase outlet or other generic connector.

The connector is typically a standard connector adapted to the available line voltage, e.g. 400 VAC, or phase voltage, e.g. 230 VAC. The line voltage may be a single phase low voltage supply having e.g. 240 volts and a 10 A fuse which will give a relatively long charging time. However, the line voltage is more often a three-phase supply, e.g. a three-phase 400 volts supply with a 32 or 63 A or even higher current fuse, which will allow a higher charging capacity and a faster charging.

According to a second aspect of the present invention, there is provided a vehicle comprising an electric power transmission system according to any one of the example embodiments as mentioned in relation to the first aspect. The vehicle may be an electrical vehicle, hybrid vehicle, or plug-in hybrid vehicle. Thus, the vehicle may be a fully electrical vehicle or a partly (i.e. a hybrid) electrical vehicle. The vehicle typically comprises at least an electrical machine, wherein the energy storage system provides power to the electrical machine for providing propulsion for the vehicle. Hence, the vehicle typically comprises a traction voltage system. In addition, the vehicle typically comprises an electrical propulsion system.

Effects and features of the second aspect of the invention are largely analogous to those described above in connection with the first aspect.

An electrical machine is used as a power source for driving the electrical vehicle when the electrical propulsion system is in the traction mode. The electrical machine may however also be used for other purposes, e.g. to power different rotational equipment such as hydraulic pumps on construction equipment vehicles.

According to one example embodiment, the electrical machine is any one of a permanent magnet synchronous machine, a brushless DC machine, an asynchronous machine, an electrically magnetized synchronous machine, a synchronous reluctance machine or a switched reluctance machine. Typically, the electrical machine is configured for driving at least a ground engaging member. Typically, the electrical machine is configured for driving a pair of ground engaging members. By way of example, the ground engaging member is a wheel, a track or the like. While the electrical machine is typically configured for driving a pair of ground engaging members, it is also conceivable that the electrical machine can be configured for driving one single ground engaging member.

According to a third aspect of the present invention, there is provided a method for controlling an electric power transmission system according any one of the example embodiments as mentioned above in relation to the first aspect. The method generally comprises controlling the bidirectional power system, by means of a control unit, to set the system in any one of the following operation: an ePTO first operation, in which power can be transferred from the energy storage system to ePTO interface via the bidirectional power system; an ePTO second operation, in which power can be transferred from the charging interface to the ePTO interface via the bidirectional power system; and a charging operation, in which power can be transferred from the charging interface to the energy storage system via the bidirectional power system.

Effects and features of the third aspect of the invention are largely analogous to those described above in connection with the first aspect.

According to a fourth aspect of the present invention, there is provided a computer program comprising program code means for performing the steps of any one of the embodiments of the third aspect when the program is run on a computer.

According to a fifth aspect of the present invention, there is provided a computer readable medium carrying a computer program comprising program means for performing the steps of any one of the embodiments of the third aspect when the program is run on a computer.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

Figure 1:
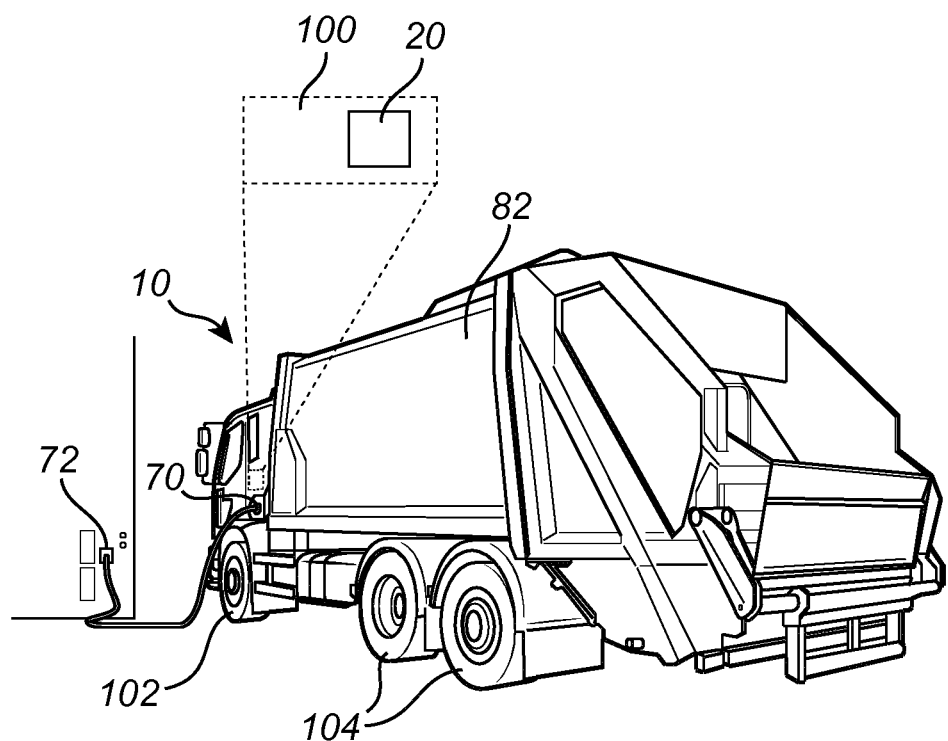
FIG. 1 is a side view of a vehicle in the form an electrical truck according to example embodiments of the invention.

With reference to the appended drawings, below follows a more detailed description of embodiments of the invention cited as examples.

DETAILED DESCRIPTION OF EXAMPLE EMBODIMENTS OF THE INVENTION

The present invention will now be described more fully with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The same reference character refer to the same elements throughout the description.

FIG. 1 illustrates a vehicle in the form of an electrical vehicle, in particular an electrical truck. The electrical truck 10 comprises here an electrical propulsion system 100 for providing propulsion to the electrical truck. In this example, the electrical truck is a refuse collection vehicle (dustcart or garbage truck). The electrical propulsion system 100 is arranged to provide power to one or several ground engaging members, such as a pair of wheels 102, or a number of pair of wheels 102 and 104. The electrical propulsion system including the electrical machine(s) is configured for driving the pair of ground engaging members 102, 104 in the form of wheels. Optional, the electrical propulsions system comprises a transmission for transmitting a rotational movement from the electrical machine(s) to a propulsion shaft, sometimes denoted as the drive shaft. The propulsion shaft connects the transmission to the pair of wheel 102, 104. Furthermore, although not shown, the electrical machine(s) is typically coupled to the transmission by a clutch. Besides providing propulsion to the vehicle, the electrical propulsion system or parts of system can manage other electronic functions of the vehicle. Moreover, the vehicle 10 comprises an electric power transmission system 20. The electric power transmission system 20 is here an integral part of the electrical propulsion system 100. The electric power transmission system can be incorporated and installed in a truck as illustrated in FIG. 1, or in any other type of partly or fully electrical vehicle. The electric power transmission system 20 may likewise be connected to the electrical propulsion system. The electric power transmission system 20 may likewise be a separate part of the vehicle.

As depicted in FIG. 1, the electric power transmission system 20 comprises a charging interface 70 for connecting to an external power supply grid 72, such as a charging station. The electric power transmission system 20 can be configured to connect either to a single- or three-phase power supply network. The charging interface is typically a 400 VAC interface configured to import power from a residential grid.

Figure 2:
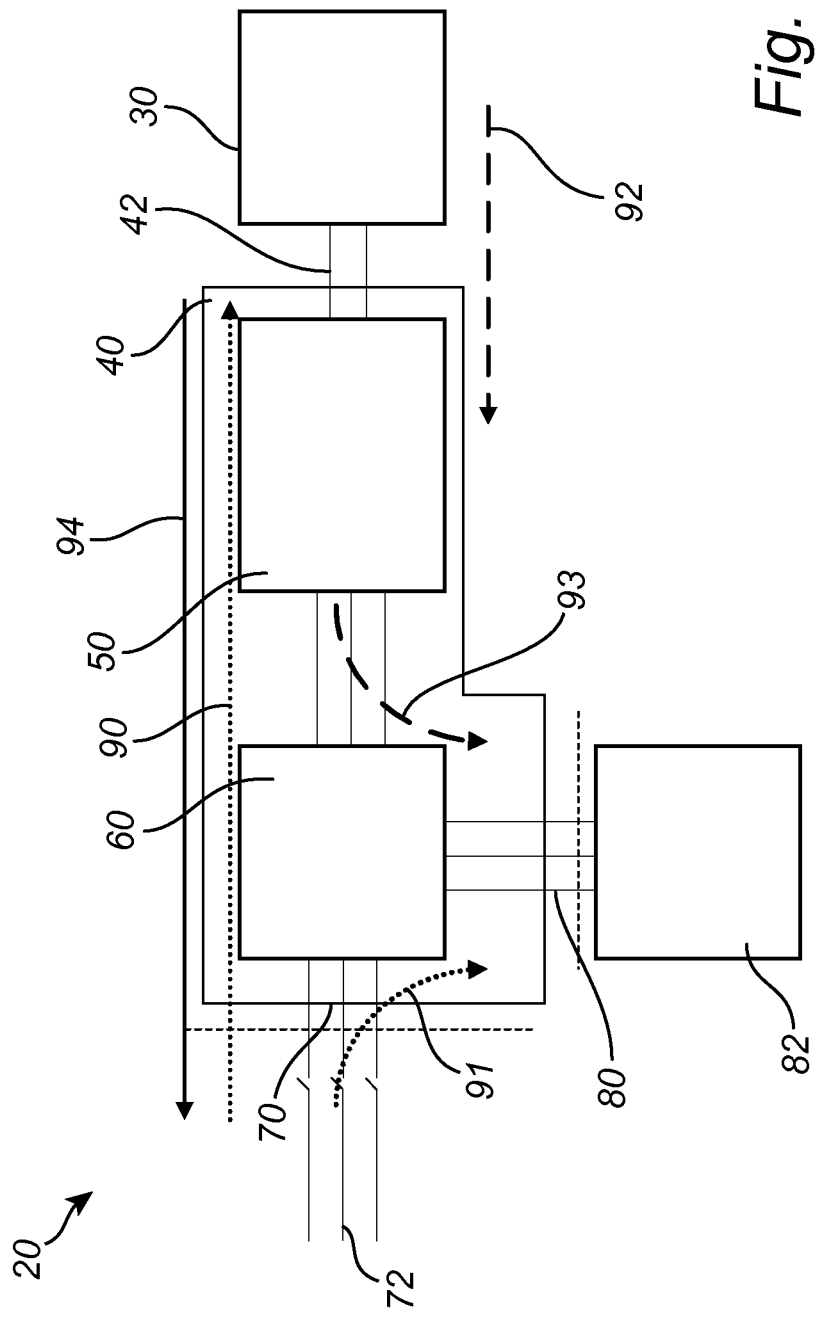
FIG. 2 schematically illustrates parts of a vehicle electric power transmission system for a vehicle according to one example embodiment of the invention.

One example embodiment of an electric power transmission system is illustrated in FIG. 2. The electric power transmission system 20 comprises an onboard energy storage system (ESS) 30. The onboard energy storage system 30 is here a DC onboard energy storage system such as a battery pack system comprising a number of battery packs (not shown). By way of example, each one of the battery packs is a lithium-ion battery. Moreover, each one of battery packs comprises a number of battery cells. For instance, the battery pack system may comprise seven battery packs. The number of battery packs in the battery pack system and the number of battery cells vary depending on the type of vehicle and the type of installation, etc. The battery pack system is arranged to provide power to one or more electrical machines (not shown) arranged for providing propulsion for the electrical truck 10.

The ESS 30 may also be arranged to power one or more internal auxiliary components commonly denoted as an auxiliary system of the vehicle. The auxiliary system can include several different components. One example of an auxiliary component is an air conditioning system (although not shown). Thus, the onboard energy storage system 30 is connected to one or more auxiliary systems or auxiliary components. The electrical truck may further comprise a battery management unit (not shown) which is configured to control and monitor the battery pack system. The battery management unit can further be configured to monitor battery cell characteristics such as state of charge (SOC) and open circuit voltage of the battery cells etc. In this example, the battery management unit is an integral part of the onboard energy storage system.

In addition, the onboard energy storage system 30 (e.g. the battery pack system) is configured to power an external power load 82, i.e. an external device requiring electrical power to operate or perform an operation. One example of an external power load is a body-builder equipment such as a crane. Another example of an external power load is an external electrical equipment connected to the vehicle. In FIG. 1, the external power load is a load body of a refuse collection truck. The load body is mounted on the chassis of the vehicle and arranged to receive collected refuse. The load body is electrically powered via the electric power transmission system 20.

Moreover, the electric power transmission system 20 comprises a bidirectional power system 40 connected to the energy storage system 30. The bidirectional power system 40 comprises a bidirectional DC/AC converter 50 for power conversion.

Further, the bidirectional power system 40 comprises a junction unit 60. The junction unit is connected to the bidirectional DC/AC converter 50. In other words, the bidirectional DC/AC converter 50 is arranged in-between the junction unit 60 and the ESS 30.

The junction unit 60 comprises a charging interface 70 for connecting to an external power supply grid 72. In this example, the externally supplied power grid is an electrical AC grid static supply source, such as a commercial grid 400 VAC. The charging interface 70 typically comprises a connector for connecting the vehicle to the external power grid static AC supply. By way of example, the charging interface comprises a connector such as a type 2 connector or an extended charging connector.

In addition, the junction unit 60 comprises an electrical power take-off (ePTO) interface 80 for connecting to the external power load 82. The ePTO interface 80 typically comprises a connector for connecting the junction unit 60 to the external power load 82. By way of example, the ePTO interface comprises a connector such as a ring terminal, standard 3 phase outlet or other generic connector. As depicted in e.g. FIG. 1, the load body (external power load) is connected to the ePTO interface and electrically powered by either the ESS and/or the external power supply grid via the electric power transmission system 20, as also further described below.

As illustrated in FIG. 2, the junction unit 60 is electrically connected via the bidirectional DC/AC converter 50 to the ESS 30. In particular, the ESS 30 is connected to the bidirectional DC/AC converter 50 by an electrical connection 42. The electrical connection is adapted for transferring electrical power. The bidirectional DC/AC converter is configured both for DC to AC conversion taking power from the battery (ESS) and for AC to DC conversion for charging the battery (ESS).

Accordingly, the junction unit 60 connects the ESS 30 via the bidirectional DC/AC converter 50 to the external power supply grid 72 via the charging interface 70. In addition, the junction unit 60 connects the ESS 30 via the bidirectional DC/AC converter 50 to the external power load 82 via the ePTO 80. In other words, the bidirectional DC/AC converter 50 is arranged between the ESS 30 and the junction unit 60. As will be described further below in relation to e.g. FIG. 5, the junction unit 60 can also include an additional contactor etc.

To this end, the junction unit 60 of the bidirectional power system 40 is configured to individually connect each one of the electrical power take-off (ePTO) interface 80 and the charging interface 70 to the onboard ESS 30. In particular, in the example as illustrated in FIG. 2, the junction unit 60 of the bidirectional power system is configured to individually connect each one of the electrical power take-off (ePTO) interface 80 and the charging interface 70 to the onboard ESS 30 via the bidirectional DC/AC converter 50.

Figure 3:
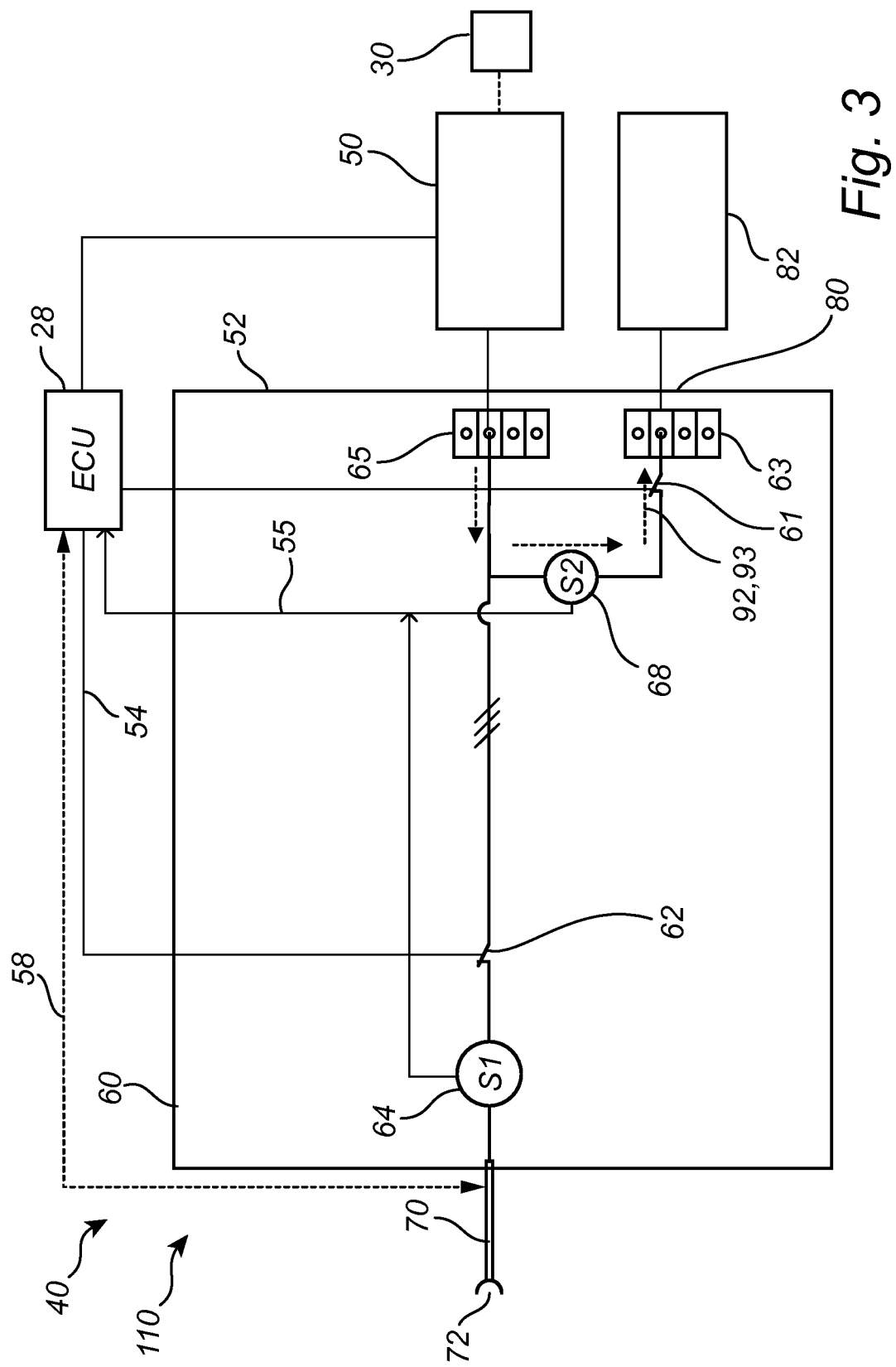
FIG. 3 schematically illustrates parts of a vehicle electric power transmission system comprising a bidirectional power system according to one example embodiment of the invention, in which the electric power transmission system is set to operate in the electrical power take-off first operation, whereby electric power is transferable from the energy storage system to the electrical power take-off interface so as to power an external power load in the form of a body-builder equipment.
Figure 4:
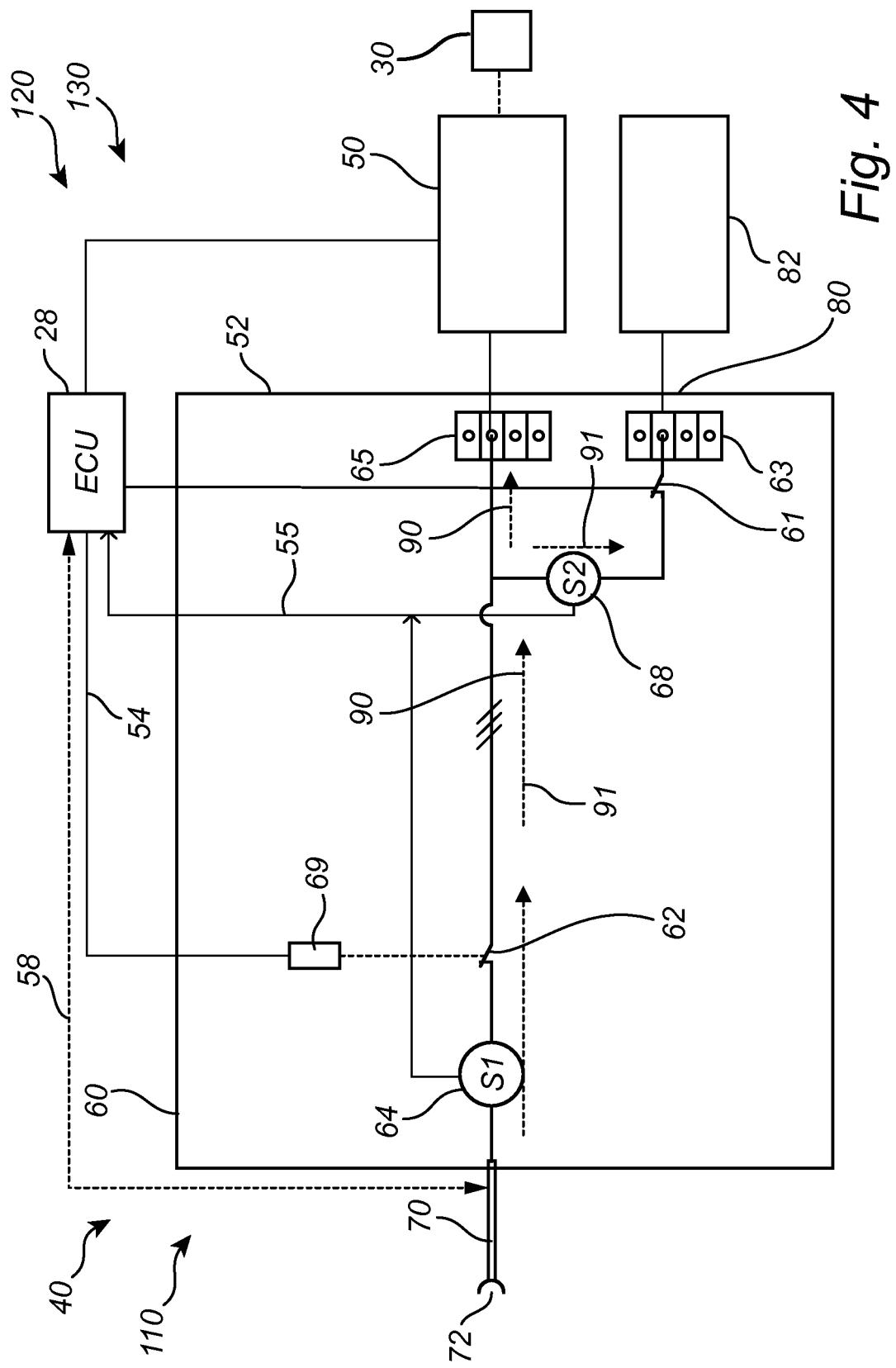
FIG. 4 schematically illustrates parts of a vehicle electric power transmission system comprising a bidirectional power system according to one example embodiment of the invention, in which the electric power transmission system is set to operate in a charging operation, in which power is transferable from a charging interface to the energy storage system via the bidirectional power system, and further set to operate in an electrical power take-off second operation, whereby electric power is transferable from the external power supply grid to the electrical power take-off interface so as to power an external power load in the form of a body-builder equipment.

By this configuration of the bidirectional power system 40, the bidirectional power system is configured to set the electric power transmission system 20 in a number of operations. In this example embodiment, the operations include a charging operation 130 (FIG. 4), an ePTO first operation 110 (FIG. 3) and an ePTO second operation 120 (FIG. 4). In other words, the bidirectional power system 40 is configured to operate the electric power transmission system in any one of the ePTO first operation, in which power is transferable from the energy storage system to the ePTO interface via the bidirectional power switch system, the ePTO second operation, in which power is transferable from the charging interface to the ePTO interface via the bidirectional power switch system, and the charging operation, in which power is transferable from the charging interface to the energy storage system via the bidirectional power switch system.

In FIG. 2, the arrows 90, 91, 92, 93 and 94 indicate a number of possible power transfer directions provided by the electric power transmission system. Accordingly, when the electric power transmission system 20 is in the ePTO first operation, the external power load 82 receives power from the onboard ESS 30 via the junction unit 60 of the bidirectional power system 40, which is configured to direct electrical power from the onboard ESS 30 to the ePTO interface 80. That is, electrical power is transferred from the ESS 30 to the bidirectional DC/AC converter 50, as indicated by arrow 92, and then from the bidirectional DC/AC converter 50 through the junction unit 60 and to the ePTO interface 80, as indicated by arrow 93. The above operation of the electric power transmission system 20 is generally controlled by a control unit, e.g. an electronic control unit.

Further, when the electric power transmission system 20 is in the ePTO second operation, the external power load 82 receives power from the external power supply grid 72 via the charging interface 70 and via the junction unit 60 of the bidirectional power system 40, which is also configured to direct electrical power from the charging interface to the ePTO interface 80. That is, electrical power is transferred from the charging interface 70 to the ePTO 80 interface through the junction unit 60, as indicated by arrow 91. The above operation of the electric power transmission system 20 is generally controlled by the control unit.

Moreover, when the electric power transmission system 20 is set in the charging operation 130, the onboard ESS 30 is charged by the external power supply grid 72. Thus, when the electric power transmission system 20 is set in the charging operation 130, the junction unit 60 is configured to direct supplied electrical power from the external power supply grid 72 via the charging interface 70 and the junction unit 60 to the bidirectional DC/AC converter 50 and further to the onboard energy storage system 30, as also indicated by arrow 90. The above operation of the electric power transmission system 20 is generally controlled by the control unit.

Optional, the bidirectional power system 40 is also configured to transfer power from the energy storage system 30 to the charging interface 70 via the bidirectional power system, as indicated by arrow 94. Hence, the bidirectional power system 40 is arranged to operate the electric power transmission system 20 in an additional external power supply operation, in which power is transferred from the energy storage system 30 to the charging interface 70 via the bidirectional power system. In this manner, the ESS can be used to supply power to the grid 72. The above operation of the electric power transmission system 20 is generally controlled by the control unit 28.

Turning now again to the configuration of the bidirectional power system 40. In FIG. 3, there is depicted an example embodiment of the bidirectional power system 40, in which the electric power transmission system 20 is set to operate in the ePTO first operation 110. In this operation, electrical power is transferable from the energy storage system 30 (as shown in FIG. 2) to the electrical power take-off interface 80 so as to power the external power load 82 in the form of a body-builder equipment, e.g. a crane (not shown). In this example, the bidirectional power system 40 comprises the electronic control unit (ECU) 28 in communication with the junction unit 60 and the bidirectional DC/AC converter 50. To maintain power supply constant to the ePTO interface, and thus to ensure a constant power to the external power load 82, e.g. when the control unit switches operation from the ePTO first operation 110 to the charging operation 130, the bidirectional DC/AC converter 50 is configured to match amplitude, frequency and phase angle of the voltage from the external power supply grid 72. Hence, the control unit is typically configured to communicate with the bidirectional DC/AC converter 50, the junction unit including the charging interface and the ePTO interface as well as with the external power supply grid (when connected), the external power load (when connected) and with the ESS 30.

The configuration in FIG. 3 is one example of a number of components making up the system, and arranged to permit the control unit 28 to operate the electric power transmission system 20. In addition, the bidirectional power system is arranged to switch between the various operations, as described above. Thus, as depicted in FIG. 3, the junction unit 60 here comprises a controllable switch 62 configured to control flow of power between the junction unit 60 and the charging interface 70. In this example, the controllable switch 62 is arranged to turn off the transfer of power to the charging interface. Hence, the controllable switch 62 is arranged to ensure that there is no voltage at the charging interface 70. Typically, the controllable switch is configured to control flow of power between the junction unit and the charging interface when the charging interface is connected to the external power supply grid 72. The controllable switch 62 is typically in communication with the control unit 28. Thus, the controllable switch is operable by the control unit 28.

Moreover, the junction unit 60 has a first sensor 64 configured to measure an electrical characteristics of the external power supply grid. The first sensor is typically configured to measure and determine the electrical characteristics. The electrical characteristic determined by the first sensor is indicative of any one of amplitude, frequency and phase angle of the power from the grid. Data from the first sensor 64 is transferrable to the ECU 28, as indicated in FIG. 3. The first sensor 64 is here arranged between the charging interface 70 and the first controllable switch 62.

Moreover, as depicted in FIG. 3, the junction unit 60 has a second sensor 68 configured to measure the flow of current to the external power load. In other words, the second sensor 68 is configured to measure the flow of current to the ePTO interface. The second sensor is typically configured to measure and determine the current. Data from the second sensor 68 is transferrable to the ECU 28, as indicated in FIG. 3.

As depicted in e.g. FIG. 3, the junction unit may optionally also comprise a connection point 65 for the bidirectional DC/AC converter 50. The junction unit may optionally also comprise a connection point 63 at the ePTO interface.

Typically, the junction unit 60 also comprises a second controllable switch 61 configured to control flow of power between the junction unit 60 and the ePTO interface 80 when connected to the external load 82. The second controllable switch 61 is useful if the system is arranged to permit one phase charging. The second controllable switch 61 is also in communication with the control unit 28. The second controllable switch 61 is in this example arranged between the second sensor 68 and the ePTO interface 80.

By the configuration of the system 40 as described above in relation to FIG. 3, the control unit 28 is operable to set the electric power transmission system 20 into any one of the operations, as described herein. In particular, the control unit 28 is arranged to control operation of the bidirectional power system so as to set the electric power transmission system 20 in the number of the operation. By way of example, the control unit 28 is arranged to handle (receive and transmit) charging communication between the external power supply grid 72, the bidirectional DC/AC converter 50 and the vehicle 10. In addition, the control unit 28 is arranged to handle power supply communication between the external power supply grid 72, the external power load 82, the bidirectional DC/AC converter 50, the ESS and the vehicle 10. By way of example, the control unit 28 is further arranged to receive data from the first sensor and the second sensor of the junction unit to determine an operational condition, e.g. applicable grid fuse size to the external power supply grid. In addition, the control unit 28 is arranged to compare the fuse size of the external power supply grid with the required current for powering the external power load at the ePTO interface. In this manner, the electric power transmission system 20 is capable of determining whether the fuse size of the external power supply grid is enough for powering the external power load at the ePTO interface.

Figure 5:
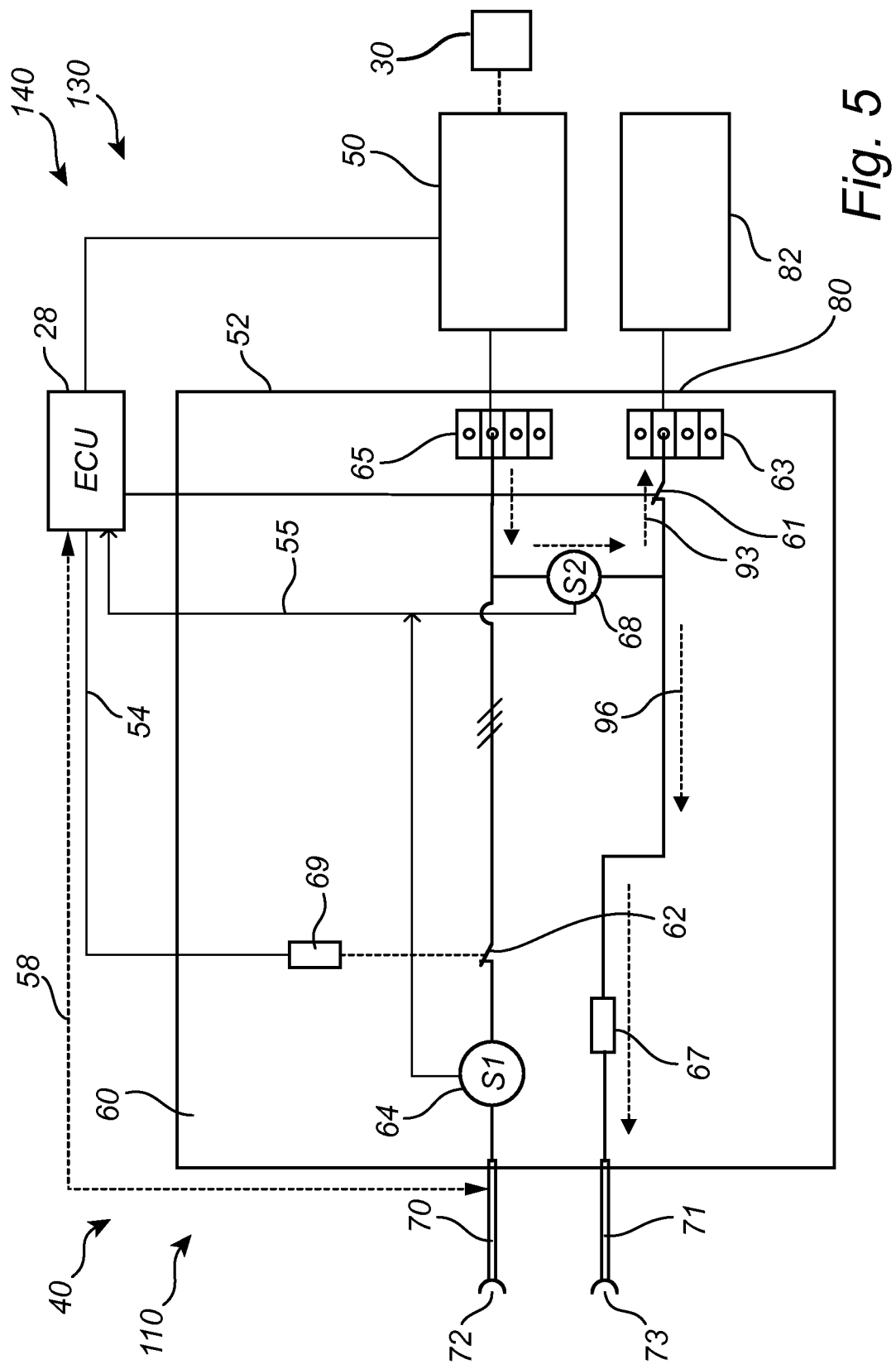
FIG. 5 schematically illustrates parts of a vehicle electric power transmission system comprising a bidirectional power system according to one example embodiment of the invention, in which the electric power transmission system is set to operate in the electrical power take-off first operation, and further set to operate in an additional external power load operation, whereby electric power is transferable from the energy storage system to an additional power supply interface.

The example of the configuration of the electric power transmission system and the operation of the control unit is only one example on how to control switching between the operations. Turning now to FIGS. 4 and 5, some further details of the flow of power in the junction unit are depicted. In particular, FIG. 4 illustrates when the electric power transmission system is set to operate in the charging operation 130. In this operation 130, power is transferable from the charging interface 70 to the energy storage system 30 via the bidirectional power system. In addition, in FIG. 4, the electric power transmission system is set to operate in the ePTO second operation 120, whereby electrical power is transferable from the external power supply grid 72 to the ePTO interface 80 so as to power the external power load 82. As depicted in FIG. 4, the flow of power from the charging interface 70 to the ESS 30 and the flow of power from the charging interface 70 to ePTO interface 80 are indicated by the arrows 90 and 91, respectively. As described above in relation to FIG. 3, the control unit is typically arranged to control the operation of the system and the switching between the operations. In particular, FIG. 4 illustrates the option of operating the system in two operations, the ePTO second operation 120 and the charging operation 130. That is, the bidirectional power system is configured to permit simultaneous transfer of electrical power in one direction between the charging interface 70 and the energy storage system 30 (corresponding to the charging operation 130) and transfer of power from the charging interface 70 to the electrical power take-off interface 80 (corresponding to the ePTO second operation 120). To this end, the bidirectional power system 40 is configured to permit simultaneous operation of the electric power transmission system 20 in the ePTO second operation 120 and the charging operation 130.

Analogously, the configuration of the junction unit 60 and the bidirectional DC/AC converter 50, as described above in relation to FIGS. 2 to 4, also provide that the bidirectional power system 40 is configured to permit simultaneous transfer of electrical power in one direction between the energy storage system 30 and the charging interface 70 and transfer of power from the energy storage system 30 to the electrical power take-off interface 80.

Analogously, the configuration of the junction unit 60 and the bidirectional DC/AC converter 50, as described above in relation to FIGS. 2 to 4, also provide that the bidirectional power system 40 is configured to permit simultaneous operation of the system in the ePTO first operation 110 and the ePTO second operation 120.

FIG. 5 schematically illustrate one example embodiment of an electric power transmission system 20, when the bidirectional power system 40 also comprises an additional external power supply interface 71 for supplying power to an additional external power source or load 73. Typically, the bidirectional power system is configured to operate the system in a so called islanding operation 140, in which power can be transferred from the energy storage system 30 to the external power supply interface 71. In this manner, the electric power transmission system 20 and the vehicle may be used to support the external power load and to establish a so called micro power grid. In this context, FIG. 5 illustrates parts of a vehicle electric power transmission system 20 comprising a bidirectional power system, in which the electric power transmission system is set to operate in the ePTO first operation, and further set to operate in an additional external power load operation. As illustrated by the arrows 93 and 96, electrical power is transferable from the energy storage system 30 to the additional external power supply interface 71 as well as to the ePTO interface 80.

The additional external interface is typically a separate interface of the junction unit 60. Thus, the additional external interface 71 comprises a connector for connecting to an external power source 73 or the like. However, it may also be possible that the additional external interface 71 is an integral part of the charging interface 70. If the additional external interface 71 is an integral part of the charging interface 70, the interface 71 and the charging interface share a common connector. It should also be noted that the ePTO interface 70 may be used to establish a micro power grid.

While not strictly required, the junction unit 60 may also comprise a first relay 69, as illustrated in FIG. 5. The first relay 69 is arranged between the first controllable switch 62 and the control unit 28. In this manner, the first relay can control operation of the first controllable switch in response to a signal from the control unit. Analogously, a second relay (not shown) may be arranged between the second switch 61 and the control unit 28 to operate the second switch. Optionally, the junction unit may comprise one or more fuses. In FIG. 5, there is a first fuse 67 arranged at the interface 71. The fuse is arranged to protect against overcurrent in the junction unit 60.

As described above, the operations as described in any one of the FIGS. 3 to 5 are possible to incorporate into the electric power transmission system 20 as described in relation to FIG. 2. In this manner, the electric power transmission system 20 is configured to switch between a number of operations 110, 120, 130 and 140 by controlling the operation of the junction unit 60 and the bidirectional DC/AC converter by means of the control unit 28.

Thus, it should be readily appreciated that the electric power transmission system 20 can be operated in a combined charging operation and ePTO second operation where power is transferred from the external power supply grid to the ESS and the external power load via the bidirectional DC/AC converter 50 and the ePTO interface 70, respectively. Analogously, it should appreciated that the electric power transmission system 20 can be operated in a combined ePTO first operation and ePTO second operation where power is transferred from the ESS via the bidirectional DC/AC converter 50 to the external power load via the EPTO interface and from the external power supply grid 72 via the charging interface 70 and to the external power load 82 via the ePTO interface 80.

Figure 6:
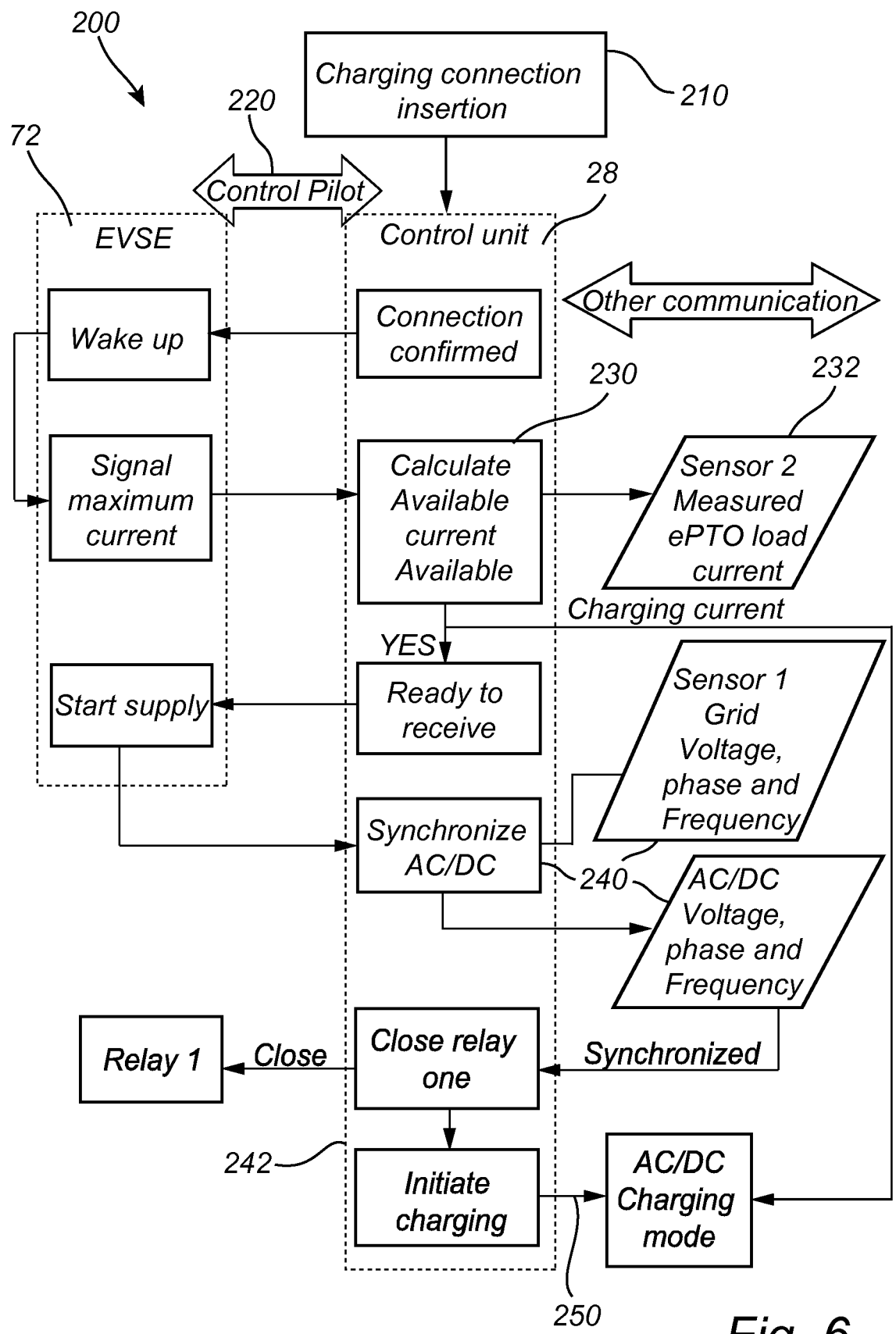
FIG. 6 schematically illustrates a flow-chart of operational steps of a vehicle electric power transmission system according to the example embodiments of the invention, in which the electric power transmission system is set to switch from the charging operation to the electrical power take-off second operation, in which power is transferable from a charging interface to an ePTO interface via the bidirectional power system, thereby permitting a transfer of power to an external power load in the form of an external electrical auxiliary such as a body-builder equipment.

It should be noted that the bidirectional power system can be operated by the control unit 28 in several different manners to set or switch the electric power transmission system into one of the operation, as described above. One possible sequence of steps when the electric power transmission system is set to switch from the ePTO first operation 110 to the ePTO second operation 120 is illustrated in FIG. 6, i.e. a switch from the operation of providing power from the ESS (to the ePTO interface) to the operation of providing power from the external power supply grid 72 to the ePTO interface. FIG. 6 illustrates a flow-chart of some operational steps of the vehicle electric power transmission system 20 according to the example embodiments, in which the control unit 28 is set to communicate with the external power supply grid 72, the electric power transmission system 20 and the external power load 82 in order to set the system in the ePTO second operation.

As depicted in FIG. 6, the method 200 comprises the step 210 of inserting charging connection into the external power supply grid. Subsequently, the control unit in step 210 typically receives information from the charging interface 70 that the charging connector is connected to the external power supply grid 72. When connecting the type 2 charging cable, the control pilot 58 can then be used. The control pilot 58 is arranged to establish a communication between the control unit and the external power supply grid 72, typically via the charging interface 70, as depicted in e.g. FIGS. 3 to 5. Accordingly, as depicted in FIG. 6, the method comprises the step 220 of communicating between the vehicle and the external power supply grid 72, which in FIG. 6 is denoted as the EVSE (electrical vehicle supply equipment). In particular, the communication is between the control unit and the external power supply grid 72 via the charging interface. The control unit confirms that a connection is established between the vehicle and the external power supply grid. The control pilot may subsequently initiate a so called wake up of the external power supply grid 72. Further, the control pilot typically signals how much electrical current that is available from the external power supply grid 72, i.e. signal maximum current. In addition, by using the information from the second sensor 68 (e.g. FIG. 3), the control unit 28 can calculate how much electrical current that is left for charging. That is, in step 230, the method calculates available current by means of the control unit and the second sensor 68. In other words, the method typically comprises the step 232 of measuring ePTO load current by means of the second sensor 68. When the control pilot and vehicle are ready for charging and the charging interface is energized, the first sensor 64 can measure voltage amplitude, phase and frequency. This information is then transferred to the bidirectional DC/AC inverter 50 via the control unit 28. The bidirectional DC/AC inverter can then adjust voltage amplitude, phase and frequency to match the external power supply grid voltage. In other words, the bidirectional DC/AC inverter support the control unit to synchronize AC/DC. This process is indicated at least partly by the step 240 in FIG. 6. When this process or sequence is completed, the control unit in step 242 transmits a signal to close the relay 69 (relay 1 in FIG. 6), which in turn closes the contact between the external power supply grid 72 and the system 20, thereby enabling the external power supply grid 72 to power the ePTO external power load 82. Accordingly, the external power supply grid 72 is now arranged to supply the ePTO external power load, and the system is set to operate into ePTO second operation 120, in which power is transferred from the external power supply grid via the charging interface to the ePTO interface via the bidirectional power system. This is briefly depicted in FIG. 6 by the step 250 of initialing charging in AC/DC charging mode (here corresponding to the ePTO second operation).

Hereby, the system 20 is arranged to permit a transfer of power to the external power load in the form of e.g. a body-builder equipment, such as crane, or a device for a dustcart as illustrated in FIG. 1. In this state of the system 20, it may also be possible for the external power supply grid to charge the ESS 30 via the junction unit 60 and the bidirectional DC/AC converter. Then, if the vehicle is disconnected from the external power supply grid, the ESS 30 may again start supplying the external power load according to the ePTO first operation 110.

It is to be understood that the present invention is not limited to the embodiments described above and illustrated in the drawings; rather, the skilled person will recognize that changes and modifications may be made within the scope of the appended claims. For example, although the present invention has mainly been described in relation to an electrical truck, the invention should be understood to be equally applicable for any type of electrical vehicle.

The invention claimed is:

1. An electric power transmission system for a vehicle comprising an energy storage system for storing electrical power and a bidirectional power system connected to the energy storage system, the bidirectional power system comprising:
   a bidirectional DC/AC converter for power conversion, the bidirectional DC/AC converter being connected to the energy storage system,
   a junction unit connected to the bidirectional DC/AC converter and comprising a charging interface for connecting to an external power supply grid, and an electrical power take-off (ePTO) interface which comprises a connector for connecting the junction unit to an external power load,
and wherein the bidirectional power system is configured to perform any one of the following operations:
   an ePTO first operation, in which power is transferred from the energy storage system to the ePTO interface via the bidirectional power system,
   an ePTO second operation, in which power is transferred from the charging interface to the ePTO interface via the bidirectional power system, and
   a charging operation, in which power is transferred from the charging interface to the energy storage system via the bidirectional power system.

2. System according to claim 1, wherein the bidirectional power system is configured to simultaneously permit transfer of power in one direction between the energy storage system and the charging interface system and transfer of power from the energy storage system to the ePTO interface.

3. System according to claim 1, wherein the bidirectional power system is configured to simultaneously perform the ePTO second operation and the charging operation.

4. System according to claim 1, wherein the bidirectional power system is configured to simultaneously permit transfer of power from the energy storage system to the ePTO interface and transfer of power from the charging interface to the ePTO interface.

5. System according to claim 1, wherein the bidirectional power system is configured to simultaneously perform the ePTO first operation and the ePTO second operation.

6. System according to claim 1, wherein the bidirectional power system further is configured to operate the system in an additional external power supply operation, in which power is transferred from the energy storage system to the charging interface via the bidirectional power system.

7. System according to claim 1, wherein the junction unit comprises:
   a controllable switch configured to control flow of power output from the charging interface,
   a first sensor configured to determine an electrical characteristic of the external power supply grid,
   and a second sensor configured to determine the flow of current to the external power load.

8. System according to claim 7, wherein the electrical characteristics determined by the first sensor is indicative of any one of amplitude, frequency and phase angle of the voltage from the external power supply grid.

9. System according to claim 1, wherein the bidirectional DC/AC converter is configured to match amplitude, frequency and phase angle of the voltage from the external power supply grid.

10. System according to claim 1, further comprising a control unit arranged to operate the bidirectional power system.

11. System according to claim 10, wherein the control unit is further configured to control charging communication between the external power supply grid, the bidirectional DC/AC converter and the vehicle.

12. System according to claim 1, wherein the junction unit comprises a second controllable switch configured to control flow of power to the ePTO interface when connected to the external load.

13. A vehicle comprising an electric power transmission system according to claim 1.

14. A method for controlling an electric power transmission system according to claim 1, characterized by controlling the bidirectional power system, by means of a control unit, to set the system in any one of the following operations: an ePTO first operation; an ePTO second operation; and a charging operation.

15. A non-transitory computer readable medium carrying a computer program comprising program code for performing the steps of claim 14 when said program code is run on a computer.

* * * * *